June 26, 1928.  1,674,749
A. S. VALENTINE
ANIMAL RACING APPARATUS
Filed Dec. 10, 1926  2 Sheets-Sheet 2
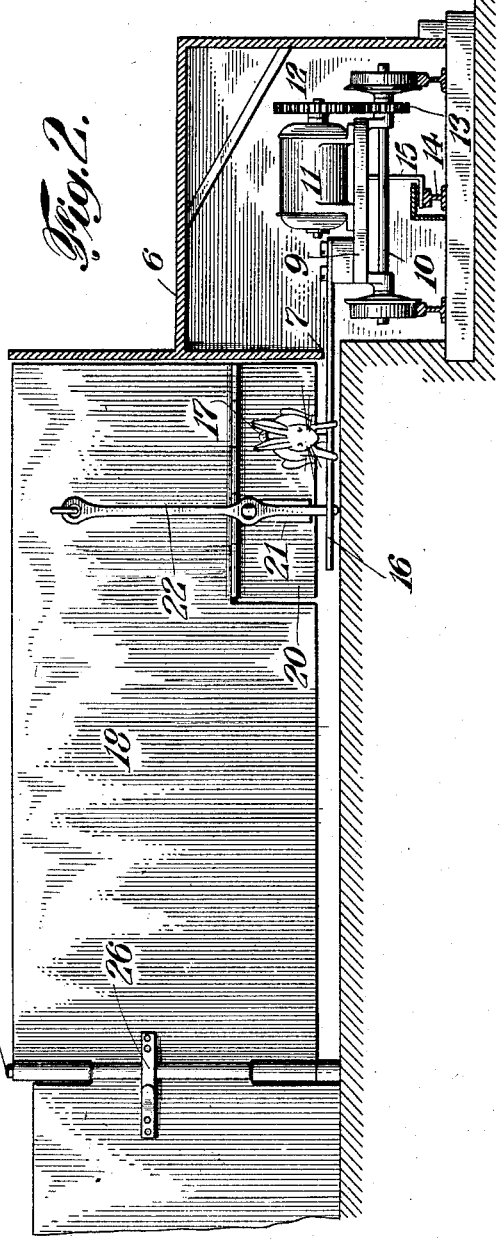
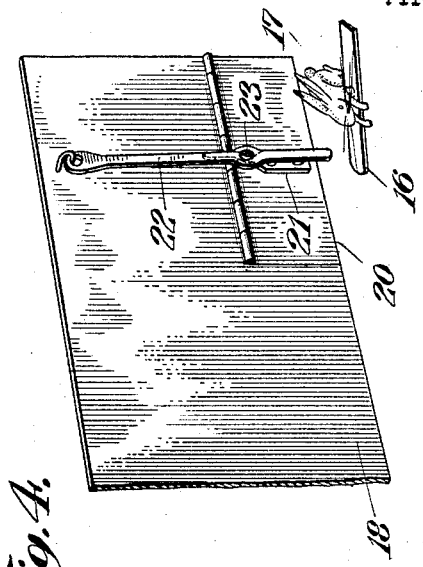
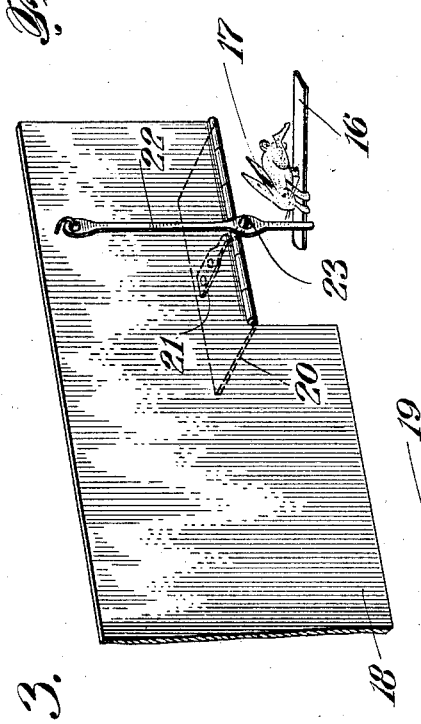
Inventor
A.S. VALENTINE
By his Attorneys
Sheffield & Betts Patented June 26, 1928.

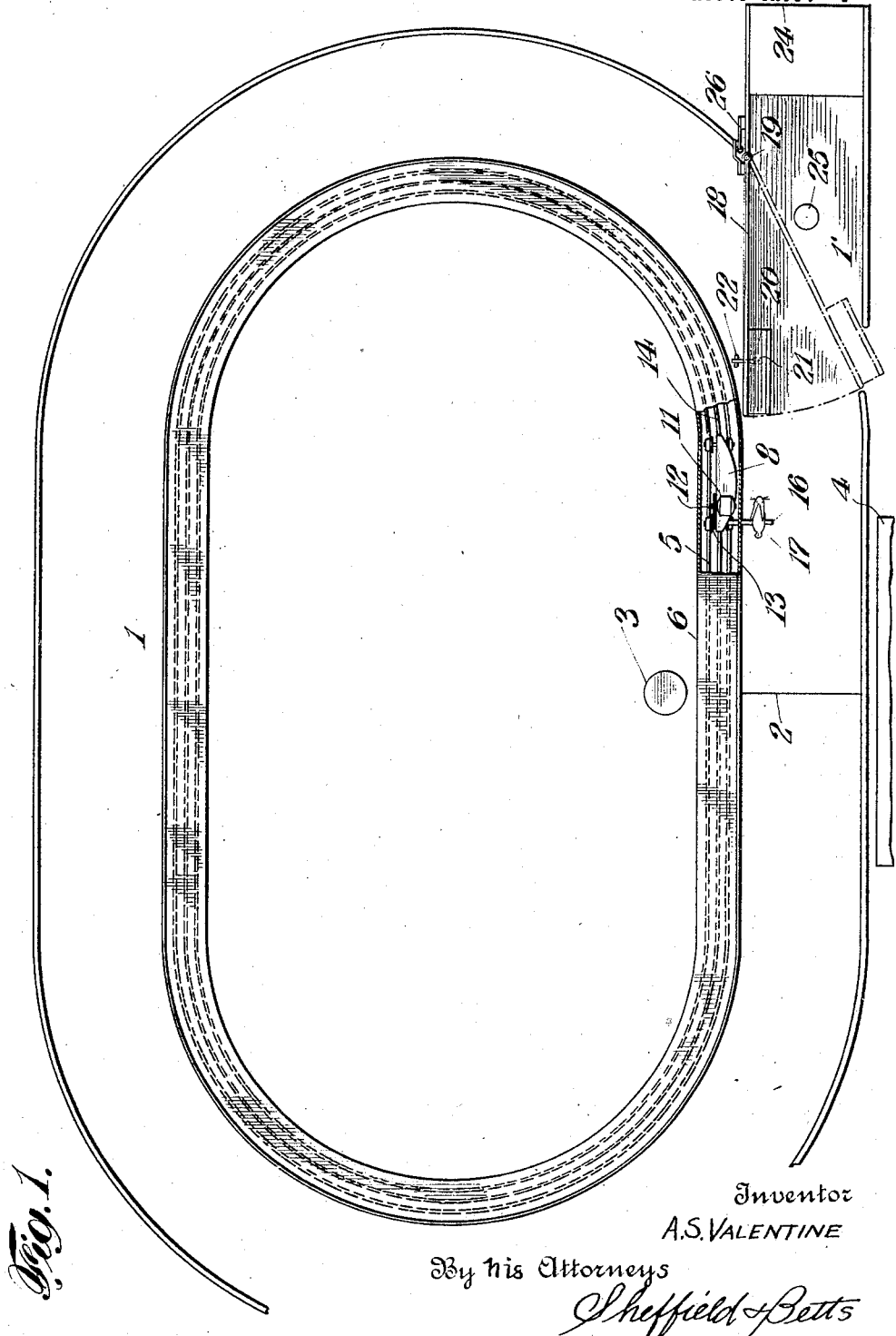

1,674,749

UNITED STATES PATENT OFFICE.

ALFRED S. VALENTINE, OF BROOKLYN, NEW YORK.

ANIMAL-RACING APPARATUS.

Application filed December 10, 1926. Serial No. 153,910.

This invention relates to animal racing apparatus and more particularly to the apparatus employed to facilitate the racing of dogs around a race course, on which they pursue an artificial lure, preferably in the form of a rabbit.

The principal object of this invention is to provide means whereby the mechanical rabbit or other form of lure may be caused to disappear or escape from the dogs at the finish of the race and the dogs switched off the race course and onto a siding or run leading to the kennels or other enclosure.

Another object of this invention is to provide an improved apparatus connected with the housing adapted to contain the carrier car, or other means employed to carry the lure around the race course, from the weather. This housing also serves to conceal the conveyor car and its appurtenances from the dogs and to concentrate their attention upon the mechanical rabbit or lure which they are pursuing.

Further objects of the invention will be apparent from the following description from which my invention will be fully understood when taken in connection with the accompanying drawings and the scope of the invention will be pointed out in the appended claims.

In the drawings, illustrating a preferred form of my invention,

Fig. 1 is a plan view of a race course showing the preferred arrangement of the apparatus described herein;

Fig. 2 is a cross sectional view through the continuous housing showing the conveyor car therein and the gate positioned across the race course, and Figs. 3 and 4 are perspective views of the gate showing the trap in opened and closed positions respectively.

In the drawings the numeral 1 represents a race course or track suitable for the racing of dogs or other similar animals. While the track illustrated is of general elliptical form it may be of any desired size and shape and is preferably divided into lanes (not shown) to avoid confusion in the race and to enable the spectators to follow a particular dog throughout the race. One of the straight portions of the race course is extended as illustrated to form a siding or run 1'. For night racing the track is usually illuminated by electric lights distributed around the track. The finish line 2 of the race course is preferably located in the straight portion of the course as shown and the judges' stand 3 and the grand stand 4 for the spectators are located with reference to the finish line as illustrated in Fig. 1.

The artificial rabbit or other form of lure which the dogs pursue is preferably carried around the race course by an arm projecting from a carrier car which may be conveniently driven by electrical or other means. This conveyor car is mounted upon endless tracks 5, which in the form of the invention shown, are located within and are parallel or concentric with the race course 1, and set in a pit at a level slightly lower than the level of the race course. The tracks 5 are enclosed by a continuous housing 6 which extends over the tracks as shown in Fig. 2. This housing 6 may be constructed in various forms but for convenience in illustrating the present invention, the form shown is desirable. It may be made of wood, metal or other material, and has a continuous slot or opening 7 therein on the side adjacent the race course 1 and at a slight distance above the surface thereof. The housing 6 is obviously of such dimensions that the conveyor car may travel through the housing without danger of striking the sides or roof thereof or any of the internal bracing members employed.

The conveyor car 8 comprises a platform 9 supported upon the axles 10. An electric motor 11 adapted to drive the conveyor car 8 through the gears 12 and 13 secured respectively to the motor shaft and to one of the axles of the conveyor car, may be positioned under the platform between the axles or preferably upon the platform 9. The motor 11 is supplied with electric current by means commonly used, one of which as illustrated comprises a third rail 14 and a contacting member or shoe 15, as illustrated in Fig. 2. An elongated member or arm 16 projects out from the platform of the conveyor car preferably from the rear end thereof and extends through the opening 7 and over the race course 1. The artificial rabbit 17 or other form of lure employed to induce the dogs to race is securely fastened to the end of the projecting member 16.

When the dogs have passed the finish line 2 at the end of the race, it is desirable that the rabbit be permitted to disappear or escape and the dogs led off the race course and into the kennels or other enclosure. To bring about this result the following apparatus is employed. A gate 18, preferably of opaque material, is hinged to a post 19 situated with respect to the race course as shown in Fig. 1. This gate is most conveniently made straight, but is not necessarily so, and extends from the post 19 to the wall of the housing 6 adjacent the race course 1. If desirable, the portion of the gate 18 adjacent the post 19 may obviously be made curved to conform to the shape of the race course at this point. During the race this gate 18 is kept in the open position shown by the dotted line in Fig. 1. When it is desired to effect the escape of the lure, the gate 18 is placed across the race course 1 manually by an operator or by any suitable means such as by a remote control from the judges' stand, so as to assume the position shown in full lines in Fig. 1.

The lower portion of the gate adjacent the housing 6 is preferably provided with a hinged door or trap 20, the width of which slightly exceeds the length of the arm 16, projecting from carrier through the housing 6 and the height of which is slightly more than the height of the lure 17. When the gate is first placed across the race course 1 and before the lure 17 has reached the gate it is, of course, essential that the door 20 be open to permit the lure to pass the gate. One means of accomplishing this result, which I deem preferable, comprises a substantially off set member 21 having the end of its shorter side securely attached to the surface of the door at a convenient distance away from the hinges thereof and having its elongated side substantially parallel with the trap. The length of the member 21 is such that when the door is swung into a horizontal position, the end of the member 21 projects beyond the plane of the gate 18. The gate 18 is provided with a member 22 hinged thereto at its upper end directly above the position of the member 21. The member 22 has a hole 23 therein adapted to receive the end of the member 21 and is of such length that the lower end thereof extends below the level of the lure-carrying arm 16 and lies in its path, thus forming a trigger device for releasing the trap or door. The door 20 is held in a horizontal position adapted to permit the lure 17 to pass the gate 18 by virtue of the end of the member 21 being positioned in the hole 23. The arm 16 striking the lower end of the hinged depending member 22 causes it to disengage from the member 21 and causes the door 20 to fall. The gate 18 thus presents a barrier to the dogs who are thus forced to follow the run 1' into the kennels or enclosure 24.

A strong electric light or lights 25 are preferably placed over the run 1' and are switched on only when the gate 18 is closed or placed across the race course 1. This may be accomplished by means of any suitable device such as a switch 26 operated by movement of the gate 18.

Having thus described this form of my invention, I do not wish to be understood as being limited to the details of form and arrangements of the parts set forth, for various changes may be made by those skilled in the art without departing from the spirit and scope of my invention.

What I claim and desire to protect by Letters Patent is:

1. In animal racing apparatus, the combination with a race track or course and a carrier car provided with a lure-carrying member, having a lure thereon, of means for effecting the escape of the lure comprising, a vertically hinged gate adapted to swing parallel with or across said race track, a door in said gate, means for supporting said door in open position comprising, a catch on said door and a member adapted to engage said catch, a member projecting into the path of said lure-carrying member by which said catch is released.

2. In animal racing apparatus, the combination with a race track or course and a carrier car provided with a lure-carrying member having a lure thereon, of means for effecting the escape of the lure comprising, a vertically hinged gate adapted to swing parallel with or across said race course, a door in said gate, means for holding said door open comprising, an arm secured to said door, a member hinged to said gate and having an opening therein adapted to receive said arm, said hinged member having a portion thereof projecting into the path of said lure-carrying member whereby the door is closed by said lure-carrying member striking said projecting portion.

3. In animal racing apparatus, the combination with a race track or course and a carrier car provided with a lure-carrying member, having a lure thereon, of a continuous housing over said carrier car, said housing being located inside of said track, means for effecting the escape of the lure comprising, a gate hinged at the outer edge of said track and adapted to swing across said race course to form a continuation of the wall of said housing, a door in said gate, means for holding said door open comprising, an arm attached to said door, a member hinged to said gate and having an opening therein adapted to receive said arm, said hinged member having a portion thereof projecting into the path of said lure-carrying member whereby the door is closed by said lure-carrying member striking said projecting portion.

Signed at Hot Springs, Ark., this 6 day of December, 1926.

ALFRED S. VALENTINE.